ര
3,031,507
γ-CYCLOHEXYLCROTONALDEHYDE
Claire Ortoli and René Reverchon, Lyon, France, assignors to Société des Usines Chimiques Rhône-Poulenc, Paris, France, a French corporation
No Drawing. Filed Oct. 24, 1958, Ser. No. 769,318
Claims priority, application France Oct. 31, 1957
1 Claim. (Cl. 260—598)

This invention relates to γ-cyclohexylcrotonaldehyde.

It is an object of the present invention to provide a new compound which when incorporated in perfume compositions comprising also other odoriferous compounds will enhance or supplement their effect.

The present invention comprises, as a new compound, γ-cyclohexylcrotonaldehyde, which has been found to have particular properties by virtue of which it can be advantageously applied in the perfumery industry. This aldehyde has the following formula:

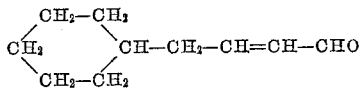

and the following characteristics:

B.P. (8 mm.) 104–105° C.
$d_{20}=0.931$
$n_D^{20}=1.4875$,

Its semicarbazone melts at 195° C.

The invention also comprises perfume compositions comprising a plurality of odoriferous compounds of which one is γ-cyclohexylcrotonaldehyde; preferably the γ-cyclohexylcrotonaldehyde is present in a minor proportion only, e.g. less than 5% and especially less than 2%, of the whole composition. The new aldehyde has a very powerful, rich, cuminic smell, and in these small proportions it enhances and supplements the effect of the other odoriferous components of the composition.

In one method of making the new aldehyde, cyclohexylaldehyde is condensed with acetaldehyde, preferably in the presence of a basic catalyst, and preferably also using a substantial excess of the acetaldehyde. In another, cyclohexylaldehyde is condensed with a vinyl ether, preferably with the aid of a Friedel-Crafts catalyst, and the resulting 1:3-dioxan derivative split by means of an acid into the cyclohexylcrotonaldehyde, cyclohexylacetaldehyde, and alcohol.

The invention is illustrated by the following examples.

Example I

A mixture of 63 g. of cyclohexylacetaldehyde, 150 g. of acetaldehyde and 100 cc. ethyl alcohol is run, in 30 minutes and at 20° C., into a solution of 2 g. of sodium hydroxide in 100 cc. of ethanol. The reaction mixture is maintained at 20° C. for 7 hours, whereafter it is allowed to stand for 14 hours at room temperature. The product is acidified with acetic acid, diluted with 1000 cc. of water, and extracted with cyclohexane, and the cyclohexane layer is washed with water. The solvent is driven off and the product is distilled. There are obtained, in addition to 40 g. of cyclohexylacetaldehyde, 14.4 g. of a fraction boiling at 116–122° C. under 10 mm. Hg and containing 50% of γ-cyclohexylcrotonaldehyde. On rectification of this fraction, the pure compound is obtained.

Example II 3 g. of ether and 0.4 g. of boron fluoride etherate are introduced into a 500 cc. flask filled with nitrogen. A mixture of 126 g. of cyclohexylacetaldehyde and 36 g. of vinyl ethyl ether is run into the flask over a period of 1 hour with agitation. Reaction commences and the temperature rises. The temperature is maintained at 55–60° C. until all the mixture has been run in. The resulting mixture is then stirred for a further hour, whereafter the boron fluoride is destroyed by the addition of 10 cc. of a 10% sodium acetate solution, and the contents of the flask allowed to separate into two layers. After decantation of the aqueous layer, the organic layer is heated under reflux with 95 g. of 100% formic acid for 4 hours and then cooled. 100 cc. of cyclohexane are added, and the mixture is washed with water until neutral and distilled under nitrogen. There are obtained 34.7 g. of a fraction boiling at 105–115° C. under 8 mm. Hg and containing 90% of γ-cyclohexylcrotonaldehyde. On rectification of this fraction, the pure compound is obtained.

Example III

A lilac perfume has the following composition. (The "parts" are by weight.)

| | Parts |
|---|---|
| γ-Cyclohexylcrotonaldehyde | 5 |
| Anisaldehyde | 10 |
| Isoeugenol | 10 |
| Benzyl acetate | 10 |
| Styrax balsam | 10 |
| Bergamot oil | 20 |
| Linalool | 30 |
| Heliotropine | 100 |
| Cinnamyl alcohol | 120 |
| Hydroxycitronellal | 140 |
| Phenylethyl alcohol | 165 |
| Terpineol | 380 |
| | 1000 |

Example IV

A rose perfume has the following composition. (The "parts" are by weight.)

| | Parts |
|---|---|
| γ-Cyclohexylcrotonaldehyde | 10 |
| Musk B R B | 10 |
| Isoeugenol | 10 |
| Patchouli oil | 10 |
| Petitgrain oil | 10 |
| Benzal acetate | 20 |
| α-Ionone | 20 |
| Heliotropine | 30 |
| Hydroxycitronellal | 30 |
| Bourbon geranium oil | 60 |
| Rhodinol P | 100 |
| Citronellol | 180 |
| Geraniol | 250 |
| Phenylethyl alcohol | 260 |
| | 1000 |

We claim:
As a compound, γ-cyclohexylcrotonaldehyde.

References Cited in the file of this patent

FOREIGN PATENTS 650,887 Great Britain _____ Mar. 7, 1951

OTHER REFERENCES

Venus-Danilova: Chemical Abstracts, vol. 29 (1935), page 2152.

Fieser et al.: Organic Chemistry, 3rd ed. (1956), page 208.